(12) United States Patent
Tokita et al.

(10) Patent No.: US 7,712,980 B2
(45) Date of Patent: May 11, 2010

(54) OPTICAL TRANSMISSION MODULE, OPTICAL TRANSMISSION APPARATUS, AND STRUCTURE FOR FIXING MEMBER

(75) Inventors: Shigeru Tokita, Yokohama (JP); Hiroo Matsue, Yokohama (JP)

(73) Assignee: Opnext Japan, Inc., Yokohama-shi (JP)

( * ) Notice: Subject to any disclaimer, the term of this patent is extended or adjusted under 35 U.S.C. 154(b) by 83 days.

(21) Appl. No.: 12/104,617

(22) Filed: Apr. 17, 2008

(65) Prior Publication Data

US 2009/0016742 A1    Jan. 15, 2009

(30) Foreign Application Priority Data

Jul. 10, 2007    (JP)  ............................... 2007-180913

(51) Int. Cl.
*G02B 6/36*      (2006.01)
*G02B 6/00*      (2006.01)

(52) U.S. Cl. .............................. 385/92; 385/53; 385/88; 385/139

(58) Field of Classification Search .................. 385/53, 385/88–89, 92, 139
See application file for complete search history.

(56) References Cited

U.S. PATENT DOCUMENTS 2,992,596 A *   7/1961   Hammer ........................ 89/16
7,044,763 B1 *   5/2006   Inoue et al. ................. 439/326

FOREIGN PATENT DOCUMENTS

JP    2006-269348    10/2006

* cited by examiner

*Primary Examiner*—Frank G Font
*Assistant Examiner*—Michael P Mooney
(74) *Attorney, Agent, or Firm*—Antonelli, Terry, Stout & Kraus, LLP.

(57) ABSTRACT

An optical transmission module mounted pluggably to a cage having an opening. The optical transmission module comprises a gasket on at least a part of an outer periphery of the module. The gasket is deformed depending on temperature change. The gasket is deformed according to temperature rise in a direction toward an inner wall of the cage to push the inner wall and deformed according to temperature drop in an opposite direction to the direction.

8 Claims, 5 Drawing Sheets

OPTICAL TRANSMISSION MODULE, OPTICAL TRANSMISSION APPARATUS, AND STRUCTURE FOR FIXING MEMBER

INCORPORATION BY REFERENCE

The present application claims priority from Japanese application JP2007-180913 filed on Jul. 10, 2007, the content of which is hereby incorporated by reference into this application.

TECHNICAL FIELD

The present invention relates to an optical transmission module, an optical transmission apparatus, and a structure for fixing a member.

BACKGROUND OF THE INVENTION

As described, for example in JP-A-2006-269348, an optical transmission module used in optical fiber communication has a structure pluggable into an optical transmission apparatus in order to facilitate maintenance and exchange of the module in consequence of breakage and performance degradation.

FIGS. 3A and 3B are views showing an external appearance of a conventional optical transmission module having a pluggable structure. As shown in FIG. 3A, the conventional optical transmission module includes an optical transmission module case 900 made of a metal to accommodate therein a light emitting diode module and a photodetector module, except electrode terminal portions thereof, and a printed wiring board (not shown in FIG. 3A, but denoted by the reference numeral 300 in FIGS. 5A and 5B), and a gasket 800 made of a sheet metal to be mounted on an outer periphery of the case 900.

As shown in FIG. 3B, the gasket 800 is formed at one end thereof with a feather-shaped plate 810, which spreads outside the optical transmission module case 900. Thereby, as shown in FIG. 4, when the optical transmission module is mounted to a metallic cage 700 arranged on a mother board 600 in the optical transmission apparatus, the feather-shaped plate 810 pushes an inner wall of the cage 700 to surely fix the optical transmission module to the cage 700.

SUMMARY OF THE INVENTION

Since the conventional optical transmission module is shaped such that the feather-shaped plate 810 pushes the inner wall of the cage 700 at all times, however, the feather-shaped plate 810 rubs the inner wall of the cage 700 at the time of mounting and dismounting as shown in FIGS. 5A and 5B and a frictional force thereof makes plugging of the module difficult. Furthermore, when an inner wall surface of the cage 700 gets injured or a refuse adheres thereto, an excessive load is concentrated on the feather-shaped plate 810 and deforms the feather-shaped plate 810, and the optical transmission module cannot be taken out of the cage 700 in some cases.

The invention has been thought of in view of the problem of the conventional art, and has its object to provide an optical transmission module which can be surely fixed in use and made readily pluggable at the time of mounting and dismounting, an optical transmission apparatus, and a structure for fixing a member.

In order to solve such problem, an optical transmission module according to the invention is mounted pluggably to a cage having an opening. The optical transmission module includes a fixation member on at least a part of an outer periphery of the module, and the fixation member is deformed depending on temperature change. The fixation member is deformed according to temperature rise in a direction toward an inner wall of the cage to push the inner wall, and deformed according to temperature drop in an opposite direction to the direction toward the inner wall.

According to the invention, when the temperature of the fixation member provided on the outer periphery of the module is increased owing to heat generated from the optical transmission module or a device arranged about the module, the fixation member is deformed in a direction toward an inner wall of the cage to push the inner wall. Conversely, when the temperature of the fixation member is decreased, the fixation member is deformed in an opposite direction to the direction toward the inner wall of the cage (going to be restored to an original configuration), so that a force, with which the fixation member pushes the inner wall of the cage, is decreased, or the fixation member separates from the inner wall of the cage. That is, during use of the optical transmission module, the fixation member pushes the inner wall of the cage according to temperature rise of the fixation member, so that the module is surely fixed to the cage. On the other hand, at the time of mounting and dismounting of the optical transmission module, a force, with which the fixation member pushes the inner wall of the cage, is decreased according to temperature drop of the fixation member caused by stoppage of use of the module (that is, a frictional force acting between the fixation member and the cage is decreased), so that the module is made readily pluggable.

According to an embodiment of the invention, the fixation member includes at least one plate-shaped member being fixed at one end thereof and free at the other end thereof. According to the embodiment, when the temperature of the fixation member is increased, a free end of a plate-shaped portion formed on the fixation member is displaced toward the inner wall of the cage with a fixed end thereof as an axis, and a portion of the plate-shaped portion pushes the inner wall of the cage. Conversely, when the temperature of the fixation member is decreased, the free end of the plate-shaped portion is deformed in an opposite direction to the direction toward the inner wall of the cage, so that a force, with which the portion of the plate-shaped portion pushes the inner wall of the cage, is decreased.

According to an embodiment of the invention, the fixation member includes a first material arranged on an inner wall side of the cage and having a smaller coefficient of thermal expansion, and a second material arranged inwardly of the material and having a larger coefficient of thermal expansion. According to the embodiment, since the second material arranged inwardly of the first material has larger coefficient of thermal expansion than the first material of the fixation member arranged on the inner wall side of the cage, the difference in coefficient of thermal expansion causes the fixation member to be deformed toward the inner wall of the cage when the temperature of the fixation member is increased. Conversely, when the temperature of the fixation member is decreased, the fixation member is going to be restored to an original configuration. According to the embodiment, the fixation member may include bimetal.

According to an embodiment of the invention, the fixation member includes a shape memory alloy. According to the embodiment, the fixation member is subjected to heat treatment to shape the member so as to push the inner wall of the cage above a predetermined temperature. Thus, it is possible to realize an optical transmission module, which is surely fixable in use and readily pluggable at the time of mounting and dismounting.

According to an embodiment of the invention, the fixation member and the cage include conductors. According to the embodiment, since the fixation member and the cage, which contact with each other, are improved in thermal conductivity, heat generated from the optical transmission module in use is effectively dissipated to the cage. Since the fixation member and the cage are improved in thermal conductivity, the fixation member and the cage are made equipotential. Therefore, by connecting the cage, to which the optical transmission module is mounted, to ground potential, electromagnetic waves radiated from the optical transmission module are effectively suppressed.

According to an embodiment of the invention, shift to an electric power saving operating mode is effected on the basis of instructions supplied from outside through a control signal conductor. According to the embodiment, by instructing to shift to the electric power saving operating mode before the optical transmission module is take out of the cage, heat generation of the optical transmission module is suppressed, so that the module is readily taken out.

According to another aspect of the invention, provided is an optical transmission apparatus, mounting thereon the optical transmission module and instructing the optical transmission module through the control signal conductor to shift to the electric power saving operating mode.

According to further aspect of the invention, provide is a member fixing structure having a first member fixing a second member. The first member includes a fixation member which is deformed according to temperature rise in a direction toward the second member to push the second member and is deformed according to temperature drop in an opposite direction to the direction toward the second member.

According to the invention, the optical transmission module can be surely fixed to the cage in use and a frictional force between the module and the cage is decreased at the time of mounting and dismounting, so that the optical transmission module is made readily pluggable.

Other objects, features and advantages of the invention will become apparent from the following description of the embodiments of the invention taken in conjunction with the accompanying drawings.

DETAILED DESCRIPTION OF THE INVENTION

Embodiments of the invention will be described below with reference to the drawings.

Embodiment 1

Figure 1A:
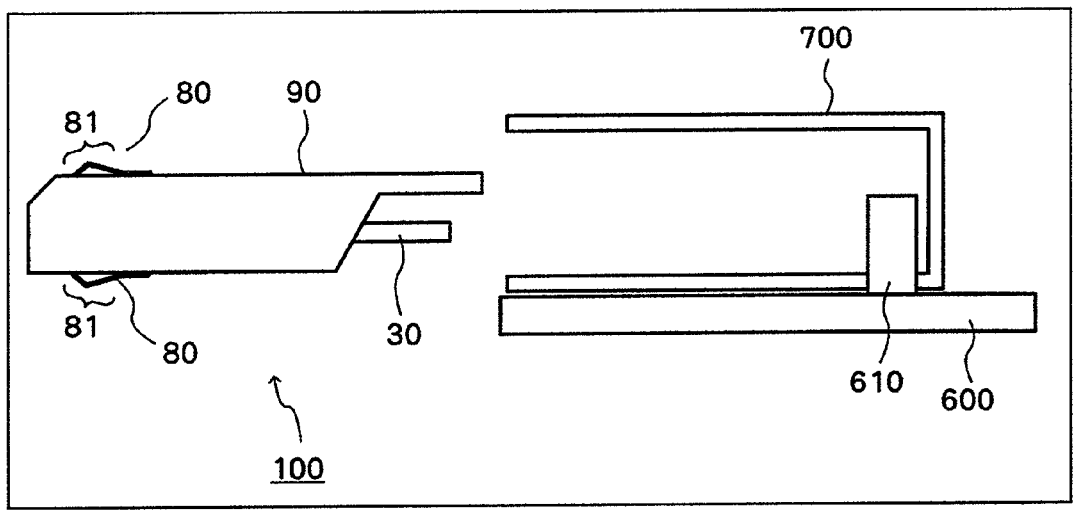
FIG. 1A is a view showing the construction of an optical transmission module, according to a first embodiment of the invention, before being mounted.
Figure 1B:
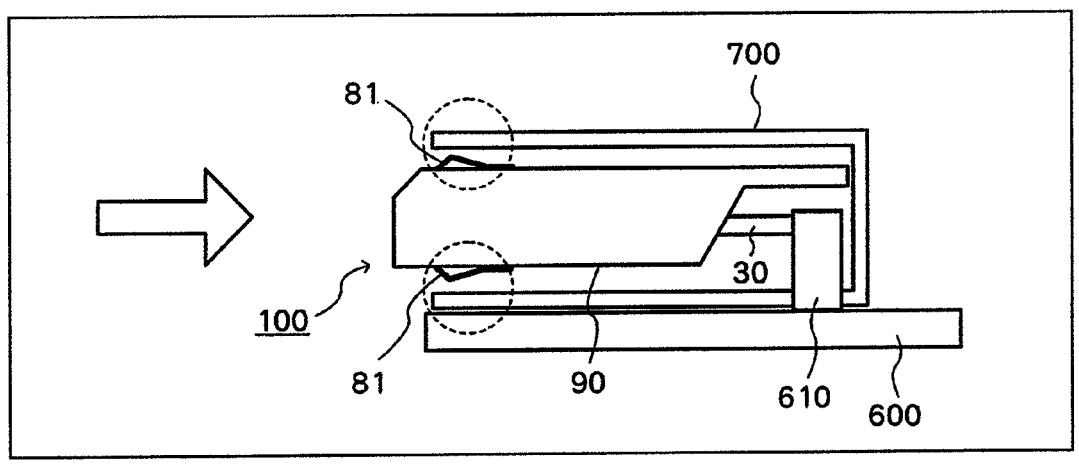
FIG. 1B is a view showing the construction of the optical transmission module, according to the first embodiment of the invention, when being mounted.
Figure 1C:
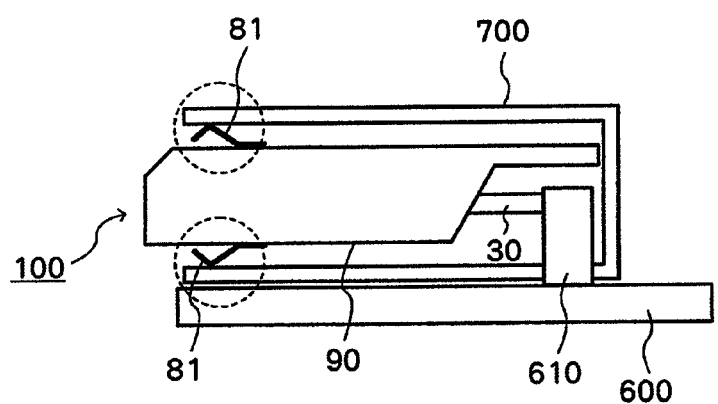
FIG. 1C is a view showing the construction of the optical transmission module, according to the first embodiment of the invention, in use.

FIGS. 1A to 1C are views showing the structure of an optical transmission module 100 according to a first embodiment of the invention. FIG. 1A shows a state before the module is mounted to a metallic cage 700 arranged on a mother board 600 in an optical transmission apparatus, and FIG. 1B shows a state when the module is mounted to the cage 700. FIG. 1C shows a state where the module is mounted to the cage 700 in use. As shown in FIGS. 1A to 1C, the optical transmission module 100 includes an optical transmission module case 90 made of a metal to accommodate therein a light emitting diode module, a photodetector module (not shown) and a printed wiring board 30, and a gasket 80 mounted to an outer periphery (or a part of the outer periphery) of the case 90.

The gasket 80 serves as a member to fix the optical transmission module 100 to the cage 700. The gasket 80 is formed from bimetal which includes two kinds of metallic plates having different coefficients of thermal expansion and stuck together. A metal having a smaller coefficient of thermal expansion is arranged on an outer side thereof (on an inner wall side of the cage in a state where the optical transmission module 100 is mounted to the cage 700) and a metal having a larger coefficient of thermal expansion is arranged on an inner side thereof (on a side toward the optical transmission module case 90). The gasket 80 is partially formed with a plurality of notches having a narrow width whereby a plurality of feather-shaped plates 81 are formed with one ends thereof fixed and the other ends thereof free.

As shown in FIG. 1A, the configuration of the feather-shaped plates 81 is determined so that the height (or width) of the optical transmission module 100 including the feather-shaped plates 81 is smaller than an opening of the cage 700 at a room temperature before the optical transmission module 100 is mounted to the cage 700. Thereby, it is possible to insert the optical transmission module 100 smoothly into the cage 700 without having the feather-shaped plates 81 contacting with the inner wall of the cage 700 (see FIG. 1B). In addition, when the optical transmission module 100 is mounted to the cage 700, the printed wiring board 30 of the optical transmission module 100 is connected to an electric connector 610 arranged on the mother board 600.

When electric power is supplied to the optical transmission module 100 through the electric connector 610 after mounting of the module, a temperature of the gasket 80 begins to be increased owing to heat generation of the optical transmission module 100 and of the optical transmission apparatus. As described above, since the gasket 80 is formed so that a metal on an inner side thereof has larger coefficient of thermal expansion than a metal on an outer side thereof, the difference in coefficient of thermal expansion causes free ends of the feather-shaped plates 81, which form a part of the gasket 80, to be displaced in an outer direction (a direction toward the inner wall of the cage 700) according to temperature rise of the gasket 80. When the displacement of the free ends is increased according to the temperature rise of the gasket 80, the feather-shaped plates 81 come into contact with the inner wall of the cage 700 and further push the inner wall of the cage 700. Thus the optical transmission module 100 in use is surely fixed to the cage 700 by the gasket 80.

Since the degree of contact between the gasket 80 made of bimetal (conductor) and the cage 700 made of a metal (conductor) is increased during use of the optical transmission module 100, the thermal conductivity between the both is heightened. Thereby, heat generated from the optical transmission module 100 is effectively dissipated to the cage 700 and the mother board 600. Also, since the electric conductivity between the both is improved, the gasket 80 and the cage 700 are made equipotential. Therefore, when the cage 700 is connected to ground potential of the mother board 600, ground potential is supplied to the gasket 80 in contact with the cage 700 and to the optical transmission module case 900 to which the gasket 80 is mounted, so that electromagnetic waves radiated from the optical transmission module 100 are effectively shielded.

On the other hand, when the optical transmission module 100 is taken out of the cage 700, electric power is stopped to be supplied to the optical transmission module 100, e.g. by making an electric source of the optical transmission apparatus OFF. Thus, heat generation of the optical transmission module 100 is stopped and temperature drop of the gasket 80 begins. As described above, since the gasket 80 is formed so that a metal on an inner side thereof has larger coefficient of thermal expansion than a metal on an outer side thereof, the difference in coefficient of thermal expansion causes the feather-shaped plates 81 to tend to be restored to an original configuration as the temperature of the gasket 80 is decreased. That is, as the temperature of the gasket 80 is decreased, the free ends of the feather-shaped plates 81 are displaced inward (to an opposite direction to the inner wall of the cage 700). When the displacement further increases, forces, with which the feather-shaped plates 81 push the inner wall of the cage 700, decrease and the feather-shaped plates 81 finally separate from the inner wall of the cage 700. In this manner, when electric power supply to the optical transmission module 100 is stopped, the optical transmission module 100 can be readily taken out of the cage 700.

According to Embodiment 1 described above, since the gasket 80 is made of bimetal which deforms depending on a temperature, the optical transmission module 100 can be surely fixed to the cage 700 in use and a frictional force between the module and the cage 700 is decreased at the time of mounting and dismounting, so that the optical transmission module 100 is made readily pluggable.

In addition, while bimetal is used to form the gasket 80 in the embodiment, the gasket 80 may not be only bimetal but also a material which deforms depending on a temperature. For example, the gasket 80 may be a sheet metal with coatings or vapour deposits of metals having different coefficients of thermal expansion on one surface and the other surface thereof, a shape memory alloy, or the like.

Embodiment 2

Figure 2:
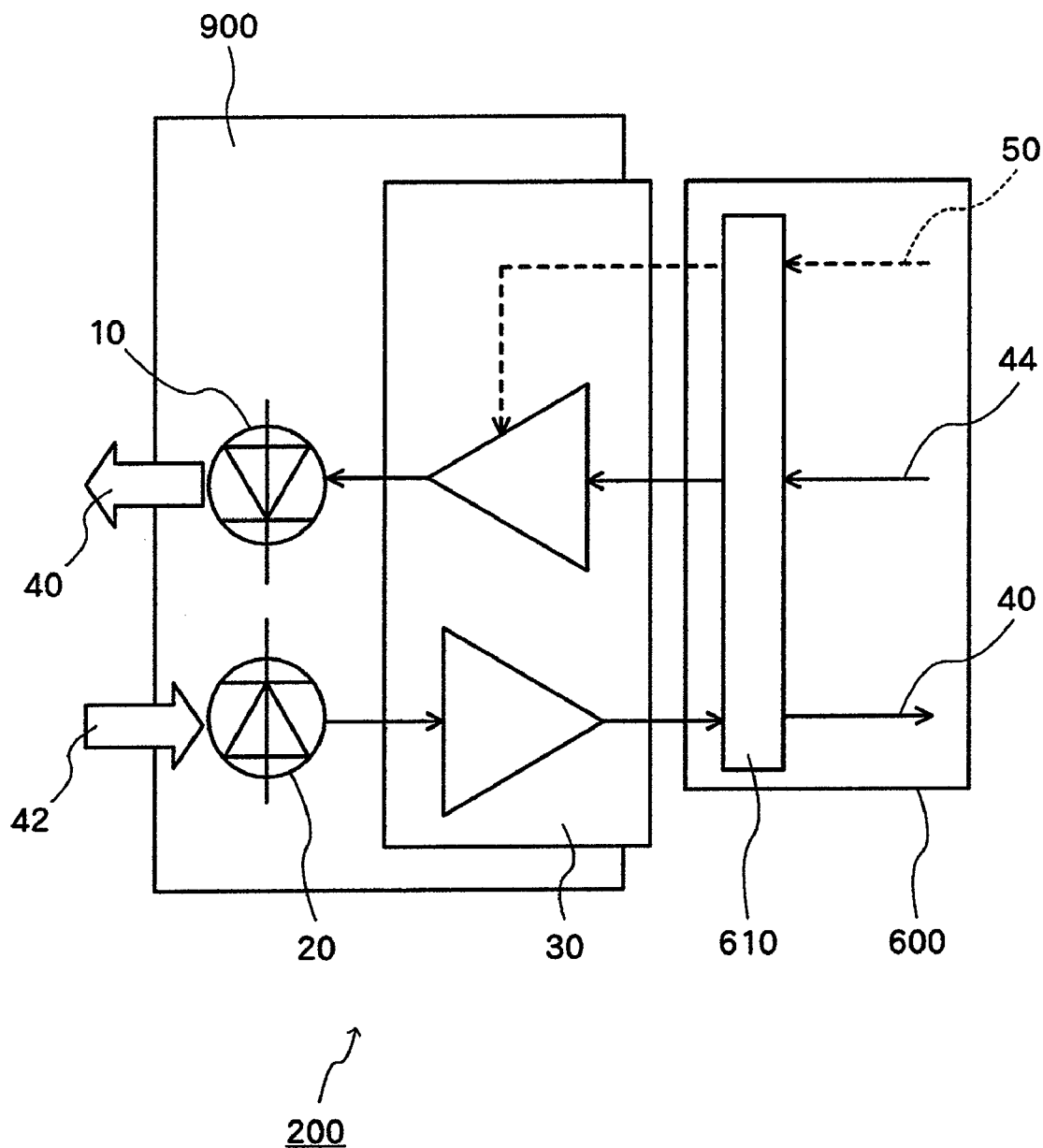
FIG. 2 is a block diagram illustrating the construction of an optical transmission module according to a second embodiment of the invention.
Figure 3A:
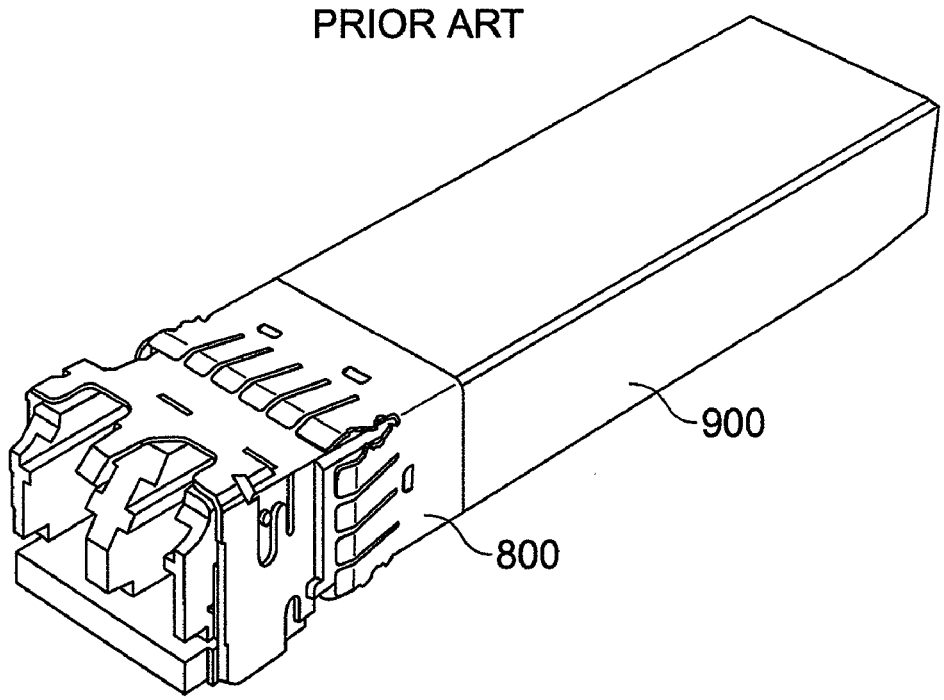
FIG. 3A is a view showing an external appearance of a conventional optical transmission module.
Figure 3B:
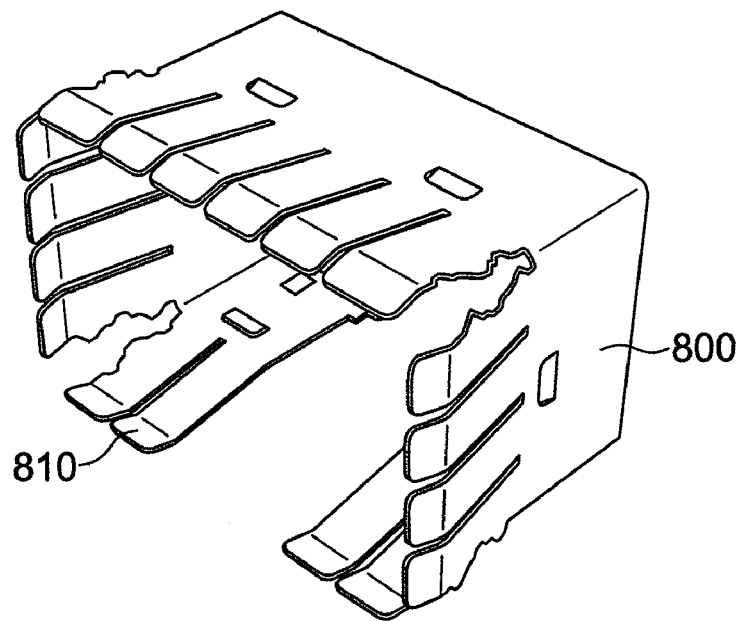
FIG. 3B is an enlarged view showing a gasket of the optical transmission module shown in FIG. 3A.
Figure 4:
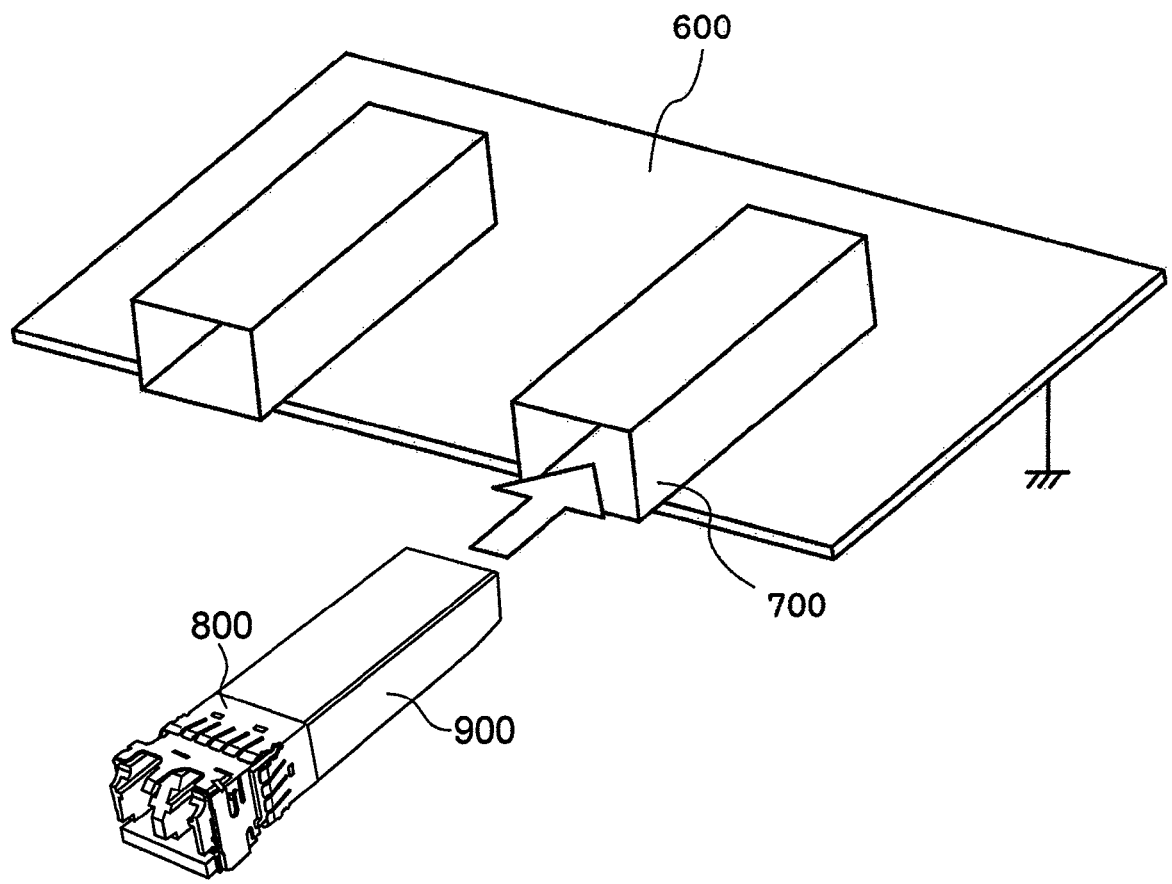
FIG. 4 is a view showing a conventional optical transmission module and a part of an optical transmission apparatus (a mother board and a metallic cage) mounting thereon the module.
Figure 5A:
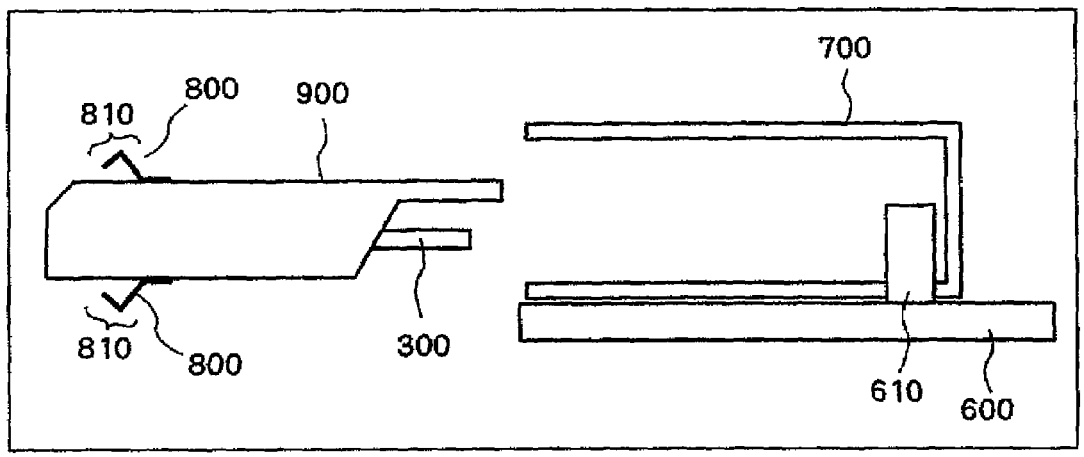
FIG. 5A is a view showing a state of a conventional optical transmission module before being mounted.
Figure 5B:
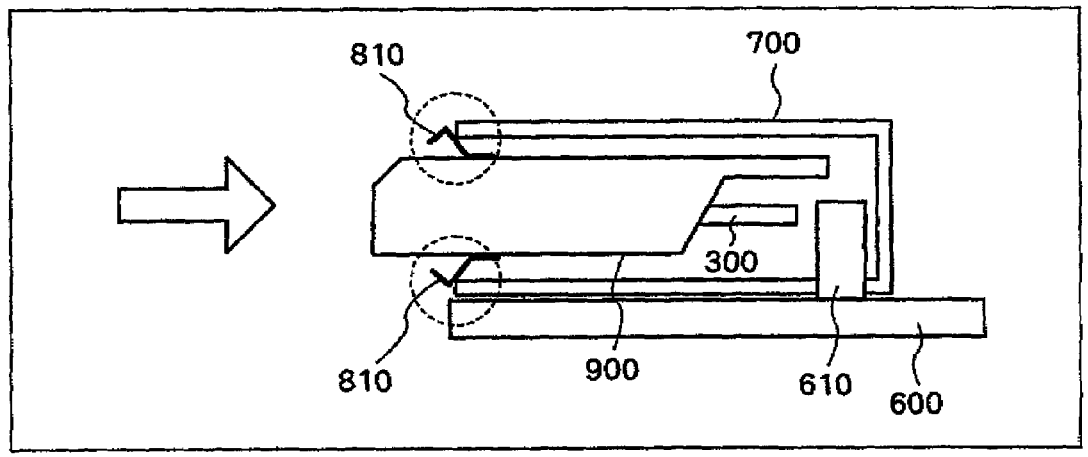
FIG. 5B is a view showing a state of the conventional optical transmission module when being mounted.

FIG. 2 is a block diagram illustrating the structure of an optical transmission module 200 according to Embodiment 2 of the invention. The optical transmission module 200 according to the embodiment includes an addition of a function (referred below to as "electric power saving operating mode") of restricting power consumption to the optical transmission module 100 according to Embodiment 1. The same elements as those of the optical transmission module 100 are denoted by the same reference numerals and a double explanation therefor is omitted.

As shown in FIG. 2, the optical transmission module 200 includes: a light emitting diode module 10 which converts an electric signal 44 from an optical transmission apparatus with the module mounted thereon into an optical signal 40 to be transmitted to a separate optical transmission apparatus; a photodetector module 20 which receives an optical signal 42 from the separate optical transmission apparatus and converts it into an electric signal 46 to be output to the optical transmission apparatus; a control unit (not shown) which controls respective circuit elements in the optical transmission module 200; a printed wiring board 30; and an optical transmission module case 900 made of a metal to accommodate the elements described above.

The optical transmission module 200 according to the embodiment includes two electric power saving operating modes, a shutdown mode and a power-down mode. The shutdown mode is one in which only electric power supply to a circuit for driving of the light emitting diode module 10 is interrupted. In this mode, optical output from the light emitting diode module 10 is stopped. The power-down mode is one in which electric power supply to all circuit elements except the control unit is interrupted and power consumption is smaller in this mode than in the shutdown mode.

Provided on the printed wiring board 30 are a control signal conductor, through which a control signal 50 (for example, a shutdown control signal, or a power-down control signal) fed from the optical transmission apparatus is received, and a serial bus (for example, I2C bus) for transmission of the electric signals 44, 46. These signals are transmitted and received between the optical transmission module and the optical transmission apparatus via the electric connector 610 connected to the printed wiring board 30.

When a shutdown control signal is fed through the control signal conductor from the optical transmission apparatus (when a voltage level signal in the control signal conductor changes to a low level from a high level), the control unit shifts an operating mode of the optical transmission module 200 to the shutdown mode. Likewise, when a power-down control signal is fed, an operating mode of the optical transmission module 200 is shifted to the power-down mode.

Thus, when the optical transmission apparatus instructs the optical transmission module 200 to shift to either electric power saving operating mode of the shutdown mode or the power-down mode, power consumption of the optical transmission module 200 is decreased and heat generation is suppressed. Therefore, the temperature of the gasket 80 of the optical transmission module 200 begins to lower and the free ends of the feather-shaped plates 81 having pushed the cage 700 are deformed inward (an opposite direction to the inner wall of the cage 700). When the displacement further increases as the temperature of the gasket 80 lowers, the feather-shaped plates 81 finally separate from the inner wall of the cage 700.

Thus, according to Embodiment 2, since the optical transmission module 200 is shifted to an electric power saving operating mode on the basis of instructions supplied from the control signal conductor, the optical transmission module 200 can be readily taken out of the cage 700 by inputting the instructions from the optical transmission apparatus. Accordingly, for example in an optical transmission apparatus including a plurality of optical transmission modules used at a time, the optical transmission module 200 according to Embodiment 2 is especially useful in the case where maintenance and exchange of a part of the optical transmission modules are required without interrupting electric power supply to the optical transmission modules.

While a shutdown control signal (or a power-down control signal) is fed through the control signal conductor in the embodiment, the control signals may be fed as serial bus interface signals through the I2C bus.

As described above, according to Embodiments 1 and 2, the optical transmission module can be surely fixed to the cage in use and a frictional force between the module and the cage is decreased at the time of mounting and dismounting, so that the optical transmission module is made readily pluggable.

In addition, while Embodiments 1 and 2 show exemplarily that the gasket is deformed depending on the temperature and is provided on a side of the optical transmission module, a fixation member may be deformed in a direction in which it pushes an outer wall of an optical transmission module according to temperature rise, and may fix the module on an inner wall side of a cage. The invention is applicable not only to an optical transmission module and a cage with the module mounted thereto but also to a general member fixing structure, in which a certain member fixes a separate member thereto.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical transmission module adapted for being mounted pluggably to a cage having an opening, the optical transmission module comprising a fixation member provided on at least a part of an outer periphery of the module, the fixation member being deformed depending on temperature change, wherein the fixation member is deformed according to temperature rise in a direction toward an inner wall of the cage to push the inner wall, and deformed according to temperature drop in an opposite direction to the direction toward the inner wall.

2. The optical transmission module according to claim 1, wherein the fixation member comprises at least one plate-shaped member being fixed at one end thereof and free at the other end thereof.

3. The optical transmission module according to claim 1, wherein the fixation member comprises a first material arranged on an inner wall side of the cage and having a smaller coefficient of thermal expansion, and a second material arranged inwardly of the first material and having a larger coefficient of thermal expansion.

4. The optical transmission module according to claim 3, wherein the fixation member comprises bimetal.

5. The optical transmission module according to claim 1, wherein the fixation member comprises a shape memory alloy.

6. The optical transmission module according to claim 1, wherein the fixation member and the cage comprise a conductor.

7. The optical transmission module according to claim 1, wherein the optical transmission module is shifted to an electric power saving operating mode on the basis of instructions supplied from outside through a control signal conductor.

8. An optical transmission apparatus comprising the optical transmission module according to claim 7, wherein the instructions are supplied to the optical transmission module through the control signal conductor to shift to the electric power saving operating mode.

* * * * *